United States Patent
Saito et al.

(10) Patent No.: US 11,425,787 B2
(45) Date of Patent: Aug. 23, 2022

(54) RECEIVING APPARATUS AND TRANSMITTING APPARATUS

(71) Applicant: NTT DOCOMO, INC., Tokyo (JP)

(72) Inventors: Keisuke Saito, Tokyo (JP); Kazuaki Takeda, Tokyo (JP); Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 214 days.

(21) Appl. No.: 16/634,433

(22) PCT Filed: Jul. 28, 2017

(86) PCT No.: PCT/JP2017/027521
§ 371 (c)(1),
(2) Date: Jan. 27, 2020

(87) PCT Pub. No.: WO2019/021474
PCT Pub. Date: Jan. 31, 2019

(65) Prior Publication Data
US 2020/0170076 A1    May 28, 2020

(51) Int. Cl.
*H04W 72/12*    (2009.01)
*H04L 5/00*    (2006.01)
(Continued)

(52) U.S. Cl.
CPC ........... *H04W 88/06* (2013.01); *H04L 5/0051* (2013.01); *H04L 27/2605* (2013.01);
(Continued)

(58) Field of Classification Search
CPC . H04L 5/0051; H04L 5/0048; H04L 27/2605; H04W 72/1273; H04W 72/1289; H04W 80/08; H04W 88/06; H04W 88/08
See application file for complete search history.

(56) References Cited

U.S. PATENT DOCUMENTS 7,860,505 B2    12/2010  Yamada et al.
2016/0095104 A1*    3/2016  Chen ..................... H04W 72/14
                                                370/329
(Continued)

FOREIGN PATENT DOCUMENTS

EP        3346755 A1    7/2018
WO    2017/038892 A1    3/2017

OTHER PUBLICATIONS

International Search Report issued in PCT/JP2017/027521 dated Oct. 17, 2017 (1 page).
(Continued)

*Primary Examiner* — Kent Krueger
(74) *Attorney, Agent, or Firm* — Osha Bergman Watanabe & Burton LLP

(57) ABSTRACT

A receiving apparatus is disclosed including a receiver that receives a downlink shared channel using a first allocation that supports a first allocation interval and a first allocation start symbol, and a second allocation that supports a second allocation interval and a second allocation start symbol, the first allocation interval and the first allocation start symbol being different from the second allocation interval and the second allocation start symbol, respectively; and a processor that applies a reference signal configuration type, notified by a higher layer, to a first reference signal used in a downlink shared channel that applies the first allocation, and to a second reference signal used in a downlink shared channel that applies the second allocation. In other aspects, a transmitting apparatus is also disclosed.

10 Claims, 11 Drawing Sheets

(51) Int. Cl.
    *H04W 88/06*     (2009.01)
    *H04L 27/26*     (2006.01)
    *H04W 80/08*     (2009.01)
    *H04W 88/08*     (2009.01)

(52) U.S. Cl.
    CPC ... *H04W 72/1273* (2013.01); *H04W 72/1289* (2013.01); *H04W 80/08* (2013.01); *H04W 88/08* (2013.01)

(56) References Cited

U.S. PATENT DOCUMENTS

| | | | |
|---|---|---|---|
| 2016/0135162 A1 | 5/2016 | Hoshino et al. | |
| 2016/0295584 A1* | 10/2016 | Chen | H04L 5/0048 |
| 2016/0338046 A1* | 11/2016 | Chen | H04L 5/0048 |
| 2018/0132211 A1* | 5/2018 | Huang | H04L 5/0094 |
| 2018/0227945 A1* | 8/2018 | Akkarakaran | H04L 5/0092 |
| 2018/0324018 A1* | 11/2018 | Hosseini | H04L 5/0007 |
| 2019/0029046 A1* | 1/2019 | Li | H04L 5/0094 |
| 2019/0159191 A1* | 5/2019 | Kim | H04W 72/14 |
| 2019/0349023 A1* | 11/2019 | Ge | H04L 5/10 |
| 2020/0127786 A1* | 4/2020 | Kwak | H04L 27/26025 |
| 2020/0296747 A1* | 9/2020 | Kim | H04W 72/00 |
| 2020/0404617 A1* | 12/2020 | Murray | H04W 16/28 |
| 2021/0218515 A1* | 7/2021 | Yi | H04L 5/0051 |

OTHER PUBLICATIONS

Written Opinion of the International Searching Authority issued in PCT/JP2017/027521 dated Oct. 17, 2017 (3 pages).

AT&T; Mini-slot Design and Operations in NR; 3GPP TSG RAN1 NR Ad Hoc Meeting, R1-1700321; Spokane, USA; Jan. 16-20, 2016 (4 pages).

NTT Docomo, Inc.; "Summary of [87-36]: Mini-slot designs for NR"; 3GPP TSG RAN WG1 AH_NR Meeting, R1-1700617; Spokane, USA; Jan. 16-20, 2017 (23 pages).

3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report in counterpart European Application No. 17919355.2 dated Feb. 10, 2021 (9 pages).

NTT Docomo, Inc.; "Discussion on DM-RS design"; 3GPP TSG RAN WG1 Meeting NR#2, R1-1711085; Qingdao, P.R. China; Jun. 27-30, 2017 (6 pages).

Office Action issued in Japanese Application No. 2019-532336 dated Sep. 14, 2021 (3 pages).

Office Action issued in Chinese Application No. 201780093824.X; Dated Feb. 23, 2022 (14 pages).

Office Action issued in Indian Application No. 202037003789; Dated Mar. 2, 2022 (7 pages).

Office Action issued in European Application No. 17919355.2; Dated Mar. 14, 2022 (5 pages).

Office Action issued in Japanese Application No. 2019-532336; Dated Apr. 12, 2022 (4 pages).

* cited by examiner

RECEIVING APPARATUS AND TRANSMITTING APPARATUS

TECHNICAL FIELD

The present invention relates to transmitting apparatus, receiving apparatus and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

Furthermore, in existing LTE systems (for example, LTE Rel. 8 to 13), downlink (DL) and/or uplink (UL) communication are carried out by using a subframe of 1 ms as a transmission period (scheduling period). When, for example, normal cyclic prefixes (NCPs) are used, this subframe is constituted by fourteen symbols at a subcarrier spacing of 15 kHz. This subframe is also referred to as a "transmission time interval (TTI)" and/or the like.

To be more specific, in DL, a DL data channel of two or more layers (rank 2) (for example, PDSCH (Physical Downlink Shared CHannel)) is demodulated by using a user terminal-specific reference signal (for example, a DMRS (DeModulation Reference Signal)). This DMRS is placed in a predetermined resource element (RE), in a subframe where PDSCH is transmitted. Multiple DMRSs of different layers (antenna ports) are frequency-division-multiplexed (FDM) and/or code-division-multiplexed (CDM).

Now, in UL, a UL data channel (for example, PUSCH (Physical Uplink Shared CHannel)) is demodulated by using a user terminal-specific reference signal (for example, a DMRS). The DMRS is allocated to a predetermined symbol in a subframe, and placed over the whole band. Where there are multiple DMRSs corresponding to varying layers, different cyclic shifts (CSs) are applied to these. Also, different orthogonal spreading codes (for example, OCCs) are applied to the DMRSs of different user terminals.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 14 or 15, 5G, NR, etc.), research is underway to introduce time units (for example, TTIs that are shorter than 1-ms TTIs (and that are also referred to as "shortened TTIs," "short TTIs," "sTTIs," "slots," "mini-slots" and so forth)) having different time lengths than the 1-ms time units used in existing LTE systems (also referred to as "subframes," "TTIs," and so on). Accompanying this introduction of different time units than existing LTE systems, it is likely transmission and receipt (or allocation) of signals will be controlled by applying a number of time units to the scheduling of data and/or others.

Assuming such future radio communication systems, if DMRSs are provided in the same arrangement patterns as in existing LTE systems (for example, LTE Rel. 8 to 13), where a data channel is scheduled in subframes of a fixed length (1 ms), there is a possibility that a data channel that might be transmitted in transmission periods of a variable length cannot be demodulated adequately. Therefore, there is a demand for DMRS arrangement patterns that are suitable for future radio communication systems where a data channel might be transmitted in transmission periods of a variable length.

The present invention has been made in view of the above, and it is therefore an object of the present invention to provide transmitting apparatus, receiving apparatus and a radio communication method that can realize transmission and/or receipt by using demodulation reference signals that are suitable for future radio communication systems.

Solution to Problem

Transmitting apparatus, according to one aspect of the present invention, has a transmission section that transmits a data channel, to which at least one of a first time unit and a second time unit is applied, the second time unit being shorter than the first time unit, and a reference signal, which is used to demodulate the data channel, and a control section that controls allocation of a first reference signal, which is used to demodulate the data channel, to which the first time unit is applied, and a second reference signal, which is used to demodulate the data channel, to which the second time unit is applied, and the control section applies the same configuration to the first reference signal and the second reference signal.

Receiving apparatus, according to another aspect of the present invention, has a receiving section that receives a data channel, to which at least one of a first time unit and a second time unit is applied, the second time unit being shorter than the first time unit, and a reference signal, which is used to demodulate the data channel, and a control section that controls receipt of a first reference signal, which is used to demodulate the data channel, to which the first time unit is applied, and a second reference signal, which is used to demodulate the data channel, to which the second time unit is applied, and the control section applies the same configuration to the first reference signal and the second reference signal.

Advantageous Effects of Invention

According to the present invention, transmission and/or receipt using demodulation reference signals suitable for future radio communication systems can be realized.

DESCRIPTION OF EMBODIMENTS

Figure 1:
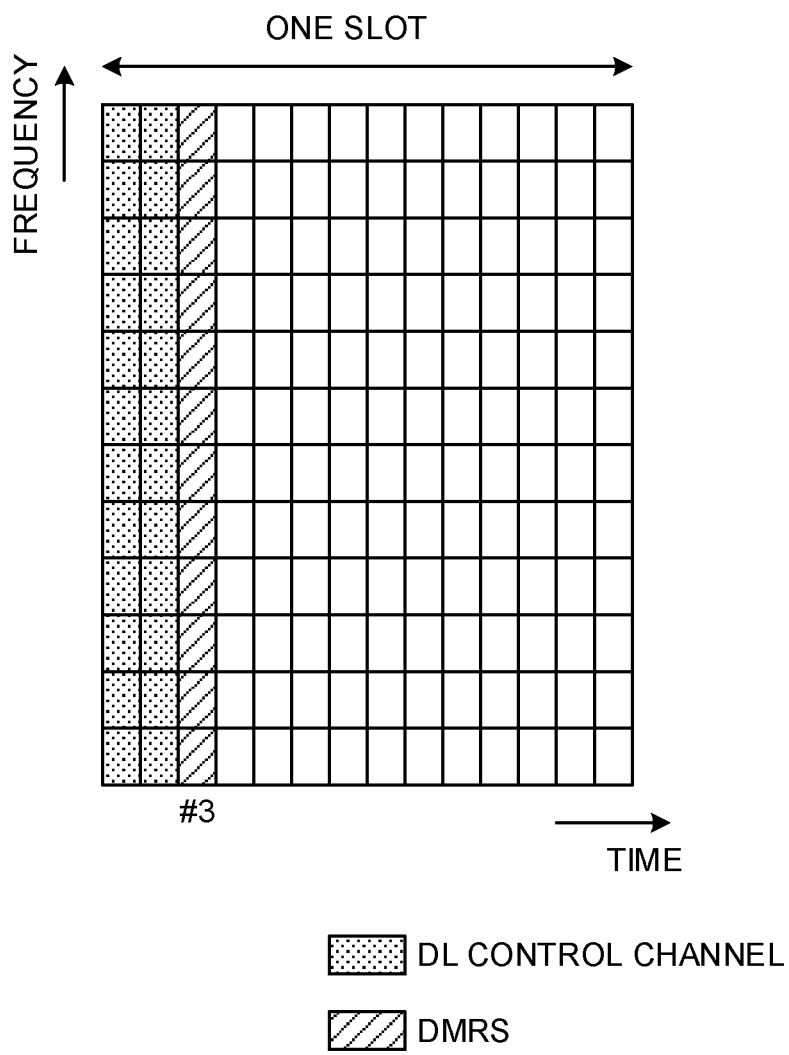
FIG. 1 is a diagram to show an example position where a DMRS is placed.

Envisaging future radio communication systems (for example, LTE Rel. 14 or later versions, 5G, NR, and so forth), studies are in progress to use a time unit having a variable time length (which may be, for example, at least one of a slot, a mini-slot and a predetermined number of symbols) as a scheduling unit for data channels (which include DL data channels and/or UL data channels, and which hereinafter may be referred to simply as "data" and so on).

A slot is a time unit that depends upon what numerology (for example, subcarrier spacing and/or the duration of symbols) a user terminal employs. The number of symbols per slot may be determined by the subcarrier spacing. For example, if the subcarrier spacing is 15 kHz or 30 kHz, the number of symbols per slot may be seven or fourteen. When the subcarrier spacing is 60 kHz or greater, the number of symbols per slot may be fourteen.

Subcarrier spacing and the duration of symbols are reciprocal to each other. Therefore, as long as the number of symbols per slot is the same, the higher (wider) the subcarrier spacing, the shorter the length of slots, and the lower (narrower) the subcarrier spacing, the longer the length of slots.

Furthermore, a mini slot is a time unit that is shorter than a slot. A mini-slots may be constituted by fewer symbols (for example, one to (the slot length −1) symbols) than a slot. When a mini-slot is contained in a slot, the same numerology as that of the slot (for example, the same subcarrier spacing and/or the same symbol duration) may be applied to the mini-slot, or a different numerology from that of the slot (for example, a wider subcarrier spacing than that of the slot and/or a shorter symbol duration than that of the slot) may be applied to the mini-slot.

In future radio communication systems where time units that are different from those of existing LTE systems are introduced, it is likely that transmission and receipt (allocation) of signals and/or channels are controlled by applying a number of time units to the scheduling of data and/or others. When, for example, data is scheduled by using varying time units, multiple data transmission periods and/or data transmission timings may be produced. For example, a user terminal to support a number of time units transmits and receives data that is scheduled in different time units.

To portray an example, scheduling based on a first time unit (for example, a slot unit) (hereinafter also referred to as "slot-based scheduling") and scheduling based on a second time unit that is shorter than the first time unit (for example, a non-slot unit) (hereinafter also referred to as "non-slot-based scheduling") may be used. The "non-slot unit" here may be, for example, a mini-slot unit, a symbol unit and/or other units. A slot can be constituted by, for example, seven symbols or fourteen symbols, and a mini-slot can be constituted by one to (the slot length −1) symbols.

In this case, the location (for example, the starting position) and the period in the time direction where data is allocated vary depending on what scheduling unit is applied to the data (for example, PDSCH or PUSCH). When slot-based scheduling is used, one piece of data is allocated to one slot. On the other hand, when non-slot-based scheduling is used (for example, when scheduling is made in units of mini-slots or symbols), data is allocated selectively, to part of the areas in one slot. Therefore, when non-slot-based scheduling is used, it is possible to allocate multiple pieces of data in one slot.

It is also anticipated that non-slot-based scheduling can be suitably applied to URLLC transmission, which at least requires low latency and high reliability. Therefore, in non-slot-based scheduling, it is important to secure the stability of communication (by executing, for example, highly reliable channel estimation and/or others).

In this way, if the location to allocate data can be controlled to change, the problem then lies in how to control the location for allocating the demodulation reference signal (DMRS) for this data. From the perspective of preventing a delay in processing time when the DMRS is used in the receiving process (including, for example, channel estimation), it is preferable to place the DMRS in the beginning part of the field where the data is allocated (see FIG. 1). The beginning part of the data-allocating field refers to the field where at least the first symbol of the data-allocating field is included.

FIG. 1 shows a case where data is allocated from the third symbol in a slot. Although a case is shown here where a control channel (for example, DCI) is allocated to the first symbol and the second symbol of the slot, the number of symbols where the control channel is allocated is not limited to this, and only part of the resources in the symbols may be used. In this case, a structure may be used in which the DMRS is placed in the third symbol, which is the symbol where data starts being allocated (front-loaded location), so that the receiving end can execute the receiving process to use the DMRS at an early timing.

Figure 2:
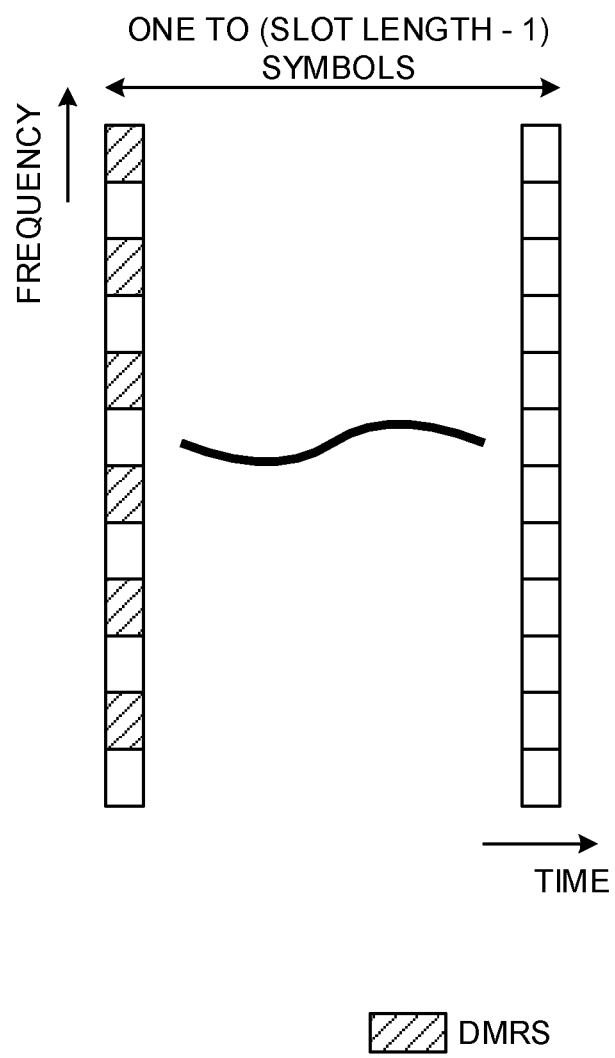
FIG. 2 is a diagram to show an example of a DMRS in non-slot-based scheduling.

Also, when non-slot-based scheduling is applied to DL communication and/or UL communication, the data transmission period (allocating field) is constituted by one to (the slot length −1) symbols, as mentioned earlier (see FIG. 2). In this case, a structure may be adopted in which the DMRS is placed at least in the symbol where the data starts being allocated (front-loaded location).

Furthermore, as to which DMRS pattern (DMRS configuration) is applied, a number of types may be used here. For example, a DMRS configuration type 1 (configuration type 1) and a DMRS configuration type 2 (configuration type 2) may be used as types of DMRS configurations (DMRS configuration types) to use when the DMRS is placed in the beginning part of the data-allocating field. Now, DMRS configuration type 1 and DMRS configuration type 2 will be described below. Obviously, DMRS configuration types that can be applied are not limited to these two, and three or more DMRS configuration types, or one DMRS configuration type may be used as well. Also, DMRS configurations may show different patterns and/or have different numbers of patterns between DL and UL, or depending on which waveform (for example, OFDM or DFT-S-OFDM) is used.

<DMRS Configuration Type 1>

DMRS configuration type 1 uses combs (transmission frequency patterns) and cyclic shifts (CSs) when a DMRS is placed in one symbol. For example, up to four antenna ports (APs) are supported using two types of combs and two types of CSs (comb 2+2 CSs). An AP may be read as a layer.

In the event DMRSs are placed in two adjacent symbols, orthogonal codes (TD-OCCs) that are defined in the time direction (for time division) may be used, in addition to combs and cyclic shifts (CSs). For example, by using two types of combs, two types of CSs, and TD-OCCs ($\{1, 1\}$ and $\{1, -1\}$), up to eight APs can be supported. Note that, in this case, a configuration to support up to four APs without using TD-OCCs ($\{1, 1\}$ and $\{1, -1\}$) may be used. Furthermore, TDM may be applied without using TD-OCCs.

<DMRS Configuration Type 2>

In DMRS configuration type 2, when a DMRS is placed in one symbol, orthogonal codes (FD-OCCs) that are defined in the frequency direction (for frequency division) are used. For example, orthogonal codes (two FD-OCCs) may be applied to two resource elements (REs) that neighbor each other in the frequency direction, to support up to six APs.

When DMRSs are placed in two adjacent symbols, orthogonal codes that are defined in the frequency direction (FD-OCCs) and orthogonal codes that are defined in the time direction (TD-OCCs) may be used. For example, orthogonal codes (two FD-OCCs) may be applied to two resource elements (REs) that neighbor each other in the frequency direction, and, furthermore, TD-OCCs ($\{1, 1\}$ and $\{1, -1\}$) may be applied to two REs that neighbor each other in the time direction, to support up to twelve APs. Note that, in this case, a configuration to support up to six APs without using TD-OCCs ($\{1, 1\}$ and $\{1, -1\}$) may be used. Furthermore, TDM may be applied without using TD-OCCs.

As described above, it may be possible to use one of a plurality of DMRS configuration types as a DMRS pattern. As mentioned earlier, a DMRS for use for data subject to slot-based scheduling and a DMRS for use for data subject to non-slot-based scheduling may be placed in different locations every time data is scheduled (transmitted). In this case, how to control the DMRS pattern when slot-based scheduling is used and when non-slot-based scheduling is used, separately, is the problem.

So, the present inventors have focused on the point that separate DMRSs can be designed for data to which a first time unit (for example, a slot unit) is applied and data to which a second time unit (for example, a non-slot unit) is applied, and come up with the idea of selecting the DMRS configuration for one DMRS based on the DMRS configuration of the other DMRS (which might include, for example, applying the same configuration to both DMRSs). According to one aspect of the present embodiment, a DMRS for use in non-slot-based scheduling is designed based on a DMRS that is used in slot-based scheduling (for example, by shifting the latter DMRS in the time direction).

In addition, when data is allocated over a number of symbols, it is desirable to place the DMRS in a number of symbols along the time direction, in order to compensate for the Doppler frequency. However, when non-slot-based scheduling is used, the field (the number of symbols) where data is allocated is subject to change, and therefore how to control the arrangement of DMRSs (the number of DMRSs) is the problem.

So, the present inventors have come up with the idea of controlling the number of DMRSs to use in non-slot-based scheduling based on the positions where DMRSs are placed in slot-based scheduling, and the period (the number of symbols) it takes to transmit data in non-slot-based scheduling. According to one aspect of the present embodiment, when non-slot-based scheduling is executed by using a number of symbols equal to or more than the positions (for example, the symbol number of a second DMRS) of DMRSs for data that is subject to slot-based scheduling, multiple DMRSs are allocated in non-slot-based scheduling.

Now, embodiments of the present invention will be described below in detail with reference to the accompanying drawings. Note that, "transmitting apparatus" as used herein may be a user terminal (UE) that transmits PUSCH in UL, or a radio base station that transmits PDSCH in DL. "Receiving apparatus" as used herein may be a radio base station that receives PUSCH in UL, or a user terminal that receives PDSCH in DL.

(First Aspect)

In the first aspect of the present embodiment, the same DMRS configuration (for example, the same DMRS configuration type) is applied to a DMRS for use for data to which scheduling based on a first time unit (for example, a slot unit) is applied, and a DMRS for use for data to which scheduling based on a second time unit (for example, a non-slot unit) is applied. For example, a structure may be used here, in which a DMRS to apply to slot-based scheduling is shifted along the time direction, and placed in the beginning part of the data field (the field including at least the first symbol) where non-slot-based scheduling is applied. DMRS configurations (or DMRS patterns) to apply to DL communication and/or UL communication may be reported (configured) from a base station to UEs in advance. For example, in DL communication and UL communication, the base station reports a predetermined DMRS configuration, out of a plurality of DMRS configurations (for example, DMRS configuration type 1 and DMRS configuration type 2), to a UE, through higher layer signaling and/or physical layer signaling. A common DMRS configuration may be applied to DL communication and UL communication, or separate DMRS configurations may be applied independently.

For example, assume a case where DMRS configuration type 1 (front-loaded DMRS configuration type 1) is designated for a UE. DMRS configuration type 1 may be applied to slot-based scheduling as well. In this case, the UE controls transmission and receipt of data that is subject to non-slot-based scheduling and the DMRS on assumption that DMRS configuration type 1 is applied to non-slot-based scheduling as well. Similarly, when DMRS configuration type 2 is used, the UE controls transmission and receipt on assumption that DMRS configuration type 2 is applied to non-slot-based scheduling as well.

In this way, by applying the same DMRS configuration to slot-based scheduling and non-slot-based scheduling, it is possible to report the DMRS configuration in one signaling, so that signaling overhead can be reduced. Note that the number of symbols for placing the DMRS in slot-based scheduling and the number of symbols for the DMRS in non-slot-based scheduling may be made different (each designed independently).

Also, when a common DMRS configuration is applied to DL communication and UL communication, the UE assumes that the DMRS configuration determined by the base station is applied to DL communication and UL communication. In this case, the signaling overhead for DMRS configurations can be further reduced. On the other hand, when different DMRS configurations are set in DL communication and UL communication separately, the UE employs the downlink DMRS configuration and the uplink DMRS configuration that are both determined by the base station. In this case, the DMRS configurations for DL communication and UL communication can be set up in a flexible manner.

Figure 3A:
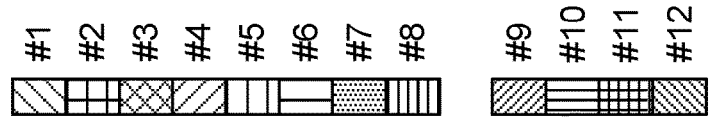
FIGS. 3A and 3B are diagrams to show examples of DMRSs for data that is subject to non-slot-based scheduling.
Figure 3A:
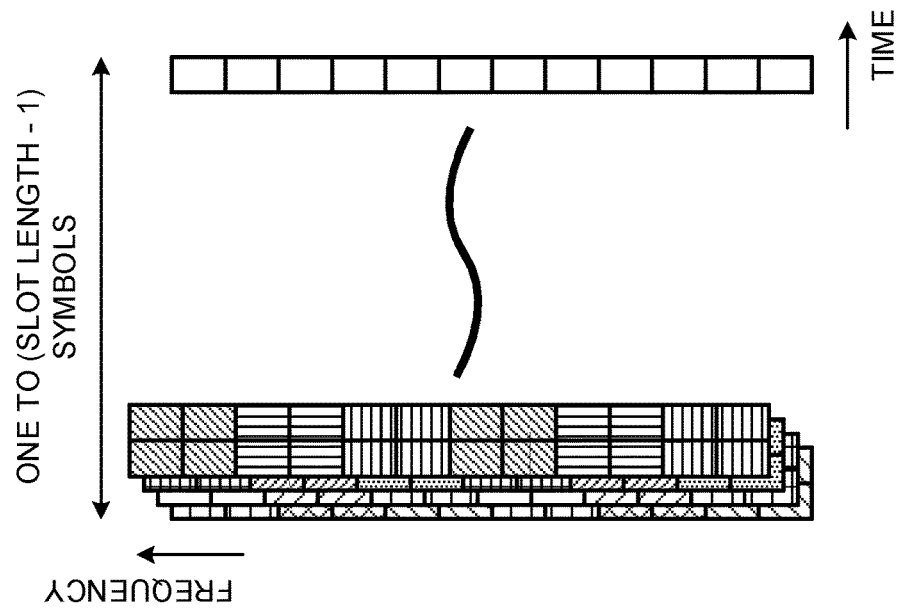

FIG. 3A is a diagram to show an example of a DMRS pattern in non-slot-based (for example, mini-slot-based) scheduling where DMRS configuration type 1 is employed. FIG. 3A shows a case where a mini-slot is allocated in one to (the slot length −1) symbols, and a DMRS is placed in two symbols (the first and second symbols of the field where data is allocated). In this case, the DMRS is placed in two symbols that neighbor each other in the time direction, so that up to eight layers (eight APs) can be supported by using combs, cyclic shifts (CSs) and orthogonal codes (TD-OCCs) that are defined in the time direction (for time division).

Also, the number of layers (APs) that can be multiplexed may be controlled (for example, limited) based on the size of the mini-slot (for example, the number of symbols). This is because, if the mini slot is small-sized, it is necessary to make smaller the field for placing the DMRS, in order to reserve field for placing data (for example, to frequency-multiplex data and the DMRS).

For example, if the size of the mini-slot is one symbol, a UE assumes that layers over two layers (two APs) are not supported (that is, only up to two layers are supported). Also, if the size of the mini-slot is two symbols, the UE assumes that layers over four layers (four APs) are not supported (that is, only up to four layers are supported). Note that, when the size of the mini slot is two symbols, the DMRS may be placed over these two symbols. Obviously, it is equally possible to place the DMRS in one of the first and second symbols.

In this way, by placing limitations on DMRS configurations (DMRS patterns) depending on the size of a mini-slot that is scheduled, it is possible to reserve the field for data, and, furthermore, time-multiplex and arrange the DMRS with data, properly.

Figure 3B:
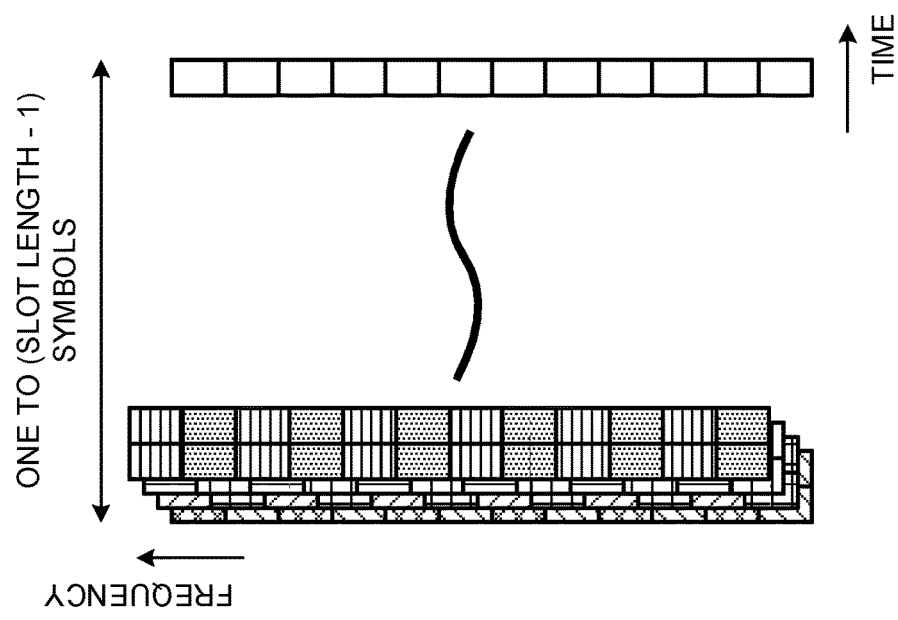

FIG. 3B is a diagram to show an example of a DMRS pattern in non-slot-based scheduling where DMRS configuration type 2 is employed. FIG. 3B shows a case in which a mini-slot is allocated in one to (the slot length −1) symbols, and the DMRS is provided in two symbols (the first and second symbols of the field where data is allocated). In this case, the DMRS is placed in two symbols that neighbor each other along the time direction, so that orthogonal codes (two FD-OCCs) are applied to two REs that neighbor each other along the frequency direction, and, furthermore, orthogonal codes (TD-OCCs) are applied to two REs that neighbor each other along the time direction. By this means, up to twelve layers (twelve APs) can be supported.

Also, the number of layers (APs) that can be multiplexed may be controlled (for example, limited) based on the size of the mini-slot (for example, the number of symbols). For example, if the size of the mini-slot is one symbol, a UE assumes that layers over four layers (four APs) are not supported (that is, only up to four layers are supported). Also, if the size of the mini-slot is two symbols, the UE assumes that layers over eight layers (eight APs) are not supported (that is, only up to eight layers are supported). Note that, if the size of the mini slot is two symbols, the DMRS may be placed over two symbols. Obviously, it is equally possible to place the DMRS in one of the first and second symbols.

In this way, by placing limitations on DMRS configurations (DMRS patterns) depending on the size of a mini-slot that is scheduled, it is possible to reserve some field for data, and, furthermore, time-multiplex and arrange the DMRS with data, properly.

Although cases have been shown with FIGS. 3A and 3B where the number of symbols used to transmit the DMRS is two, the number of symbols to place the DMRS is not limited to this (in the event multiple DMRS are placed, these are arranged in a row). The DMRS may be placed in one symbol or in three or more symbols.

The number of symbols to place the DMRS (for example one or two symbols) may be determined based on predetermined conditions. For example, the number of symbols for placing the DMRS may be controlled based on the size of a mini-slot and/or the number of layers (or APs) for use for transmission.

To illustrate an example, when single-user MIMO (SU-MIMO) is employed, and transmission is carried out using a predetermined number of or fewer layers (or APs), the DMRS is placed in one symbol (the first symbol in the data field). On the other hand, when transmission is carried out using a larger number of layers (or APs) than the predetermined number, the DMRS is placed in two symbols (the first and second symbols in the data field). The predetermined number may be, for example, four.

When the number of transmission layers is equal to or less than a predetermined number, one symbol may be used for the DMRS, and the other symbols can be used for the data-allocating field. In this way, by controlling the number of symbols to use to transmit the DMRS based on the number of layers for use for transmission, the efficiency of the use of resources can be improved based on transmission conditions.

Note that, when MU-MIMO is employed, the number of symbols to place the DMRS may be determined based on the size of a mini-slot and/or the number of layers (or APs) for use for transmission, or may be determined by taking other parameters into account.

In this way, the DMRS configuration for slot-based scheduling is used for the DMRS for non-slot-based scheduling, so that, even when scheduling is made in multiple time units, it is possible to make the DMRS configuration simple. Also, by applying the DMRS configuration type for slot-based scheduling to non-slot-based scheduling, the density of DMRSs can be made higher than in slot-based scheduling, so that, compared to slot-based scheduling, the accuracy of data demodulation can be improved.

Next, specific examples of operation of transmitting apparatus and receiving apparatus in DL communication and UL communication will be described below.

<DL Communication>

The transmitting apparatus (base station) applies the same DMRS configuration to a first downlink DMRS for data (for example, PDSCH) that is transmitted in slot units, and to a second downlink DMRS for a PDSCH that is transmitted in non-slot units.

For example, the base station places the first downlink DMRS in predetermined symbols (for example, symbols including at least the third or the fourth symbol in a slot) in the data field where slot-based scheduling is applied. Also, the base station places the second downlink DMRS in predetermined symbols (for example, symbols including at least the first symbol) in the data field where non-slot-based scheduling is applied. Note that the second downlink DMRS may be provided by shifting the first downlink DMRS in the time direction.

The number of layers (APs) to be supported by the second downlink DMRS may be determined based on the number of symbols (for example, the mini-slot size) where data subject to non-slot-based scheduling is placed. Also, the number of symbols to place the second downlink DMRS may be determined based on predetermined conditions. The predetermined conditions may include, for example, the number of layers (APs) to apply to DL transmission, and/or the mini-slot size. Alternatively, information about the number of symbols where the DMRSs are placed may be reported from the base station to a UE by using downlink control information and/or the like.

Also, the base station reports information about the DMRS configurations to apply to the DMRSs, to the receiving apparatus (UE), through higher layer signaling and so on. For example, the base station reports, to the UE, the DMRS configuration (pattern) to apply to the DMRS for data subject to slot-based scheduling (and/or non-slot-based scheduling).

The receiving apparatus (UE) performs the receiving process on assumption that the first downlink DMRS is placed in predetermined symbols (for example, symbols including at least the third or the fourth symbol in a slot) in the data field where slot-based scheduling is applied. Also, the UE performs the receiving process on assumption that the second downlink DMRS is placed in predetermined symbols (for example, symbols including at least the first symbol) in the data field where non-slot-based scheduling is applied.

Also, the UE identifies the configuration of the second downlink DMRS based on the DMRS configuration-related information reported from the base station, and performs the receiving process. This DMRS configuration-related information may be reported as information about the first downlink DMRS configuration.

<UL Communication>

The transmitting apparatus (UE) applies the same DMRS configuration to a first uplink DMRS for data (for example, PUSCH) that is transmitted in slot units, and to a second uplink DMRS for a PUSCH that is transmitted in non-slot units.

For example, the UE places the first uplink DMRS in predetermined symbols (for example, symbols including at least the first symbol) in the data field where slot-based scheduling is applied. Also, the UE places the second uplink DMRS in predetermined symbols (for example, symbols including at least the first symbol) in the data field where non-slot-based scheduling is applied. Note that the second uplink DMRS may be provided by shifting the first uplink DMRS in the time direction.

The number of layers (APs) to be supported by the second uplink DMRS may be determined based on the number of symbols (for example, the mini-slot size) where data subject to non-slot-based scheduling is placed. Also, the number of symbols to place the second uplink DMRS may be determined based on predetermined conditions. The predetermined condition may be the number of layers (APs) applied to the UL transmission and/or mini-slot size. Alternatively, information about the number of symbols where the DMRSs are placed may be received from the base station by using downlink control information and/or the like.

In addition, the UE receives information about the DMRS configurations to apply to the DMRSs, from the base station, through higher layer signaling and so on. For example, the configuration (pattern) to apply to the DMRS for data subject to slot-based scheduling (and/or non-slot-based scheduling) is reported from the base station to the UE.

The receiving apparatus (base station) performs the receiving process on assumption that the first uplink DMRS is placed in predetermined symbols (for example, symbols including at least the first symbol) in the data field where slot-based scheduling is applied. Also, the base station performs the receiving process on assumption that the second uplink DMRS is placed in predetermined symbols (for example, symbols including at least the first symbol) in the data field where non-slot-based scheduling is applied.

Also, the base station identifies the configuration of the second downlink DMRS based on the DMRS configuration-related information to report to the UE, and performs the receiving process. This DMRS configuration-related information may be reported as information about the first downlink DMRS configuration.

(Second Aspect)

In a second aspect of the present embodiment, based on where the DMRS (for example, the second DMRS in the time direction) for use for data subject to scheduling in first time units (for example, slot-based scheduling) is located, whether or not to provide an additional DMRS, which is placed on an additional basis apart from the beginning part of the data field where scheduling in second time units (for example, non-slot-based scheduling) is applied, is controlled.

In non-slot-based scheduling, the field (the mini slot size) in which data is scheduled may vary from scheduling to scheduling. When the size (the number of symbols) of a mini-slot is larger than a predetermined value, it is preferable to place a DMRS, in addition to the DMRS of the beginning part, from the perspective of compensating for the Doppler frequency and improving the accuracy of channel estimation.

In the second aspect, whether or not to provide an additional DMRS for data for non-slot-based scheduling is controlled based on the position of the DMRS provided in the data field where slot-based scheduling is applied and the size (the number of symbols) of the data field where non-slot-based scheduling is applied.

For example, assume a case where the DMRS is provided in the X-th symbol, in addition to predetermined symbols (for example, three or four symbols) in a slot in the data field where slot-based scheduling is applied. X may have a symbol number behind the DMRS in the beginning part of the slot, and, for example, when a slot is formed with fourteen symbols and the DMRS of the beginning part is inserted in three or four symbols, X may be a symbol number including at least one of the fifth to the fourteenth symbols constituting the slot (for example, the ninth symbol).

Figure 4:
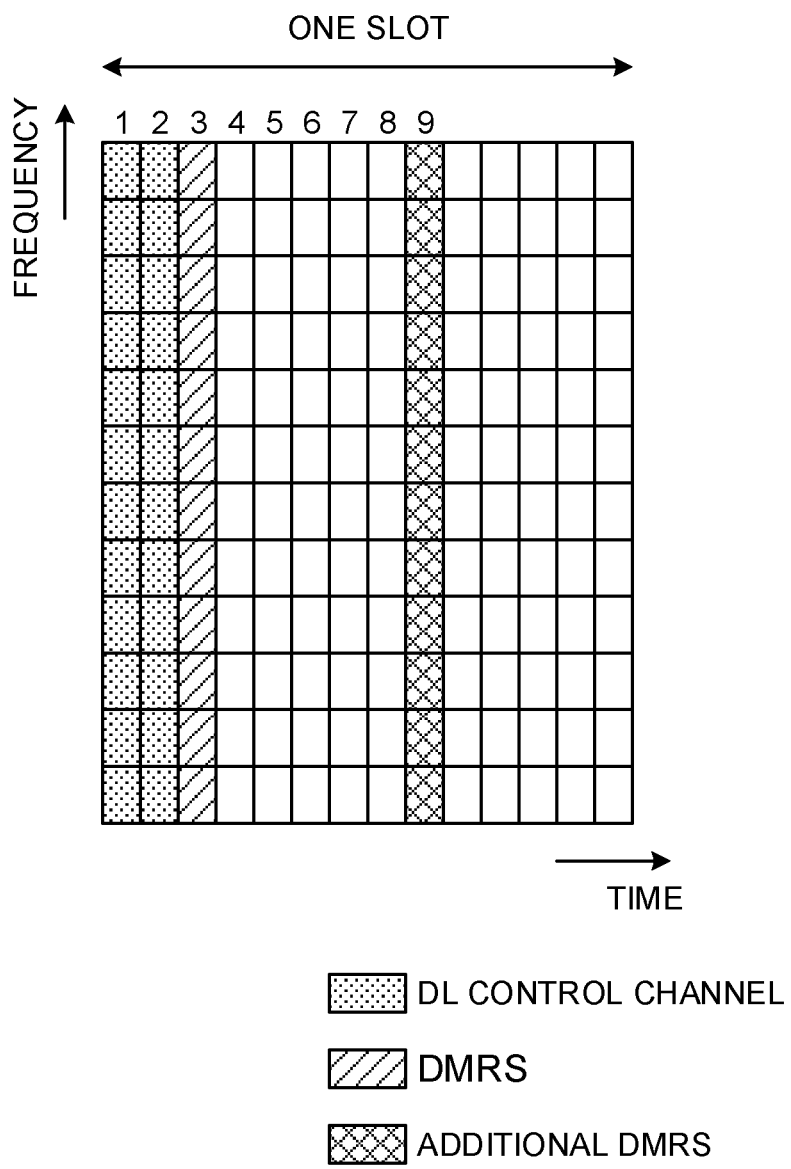
FIG. 4 is a diagram to show an example of an additional DMRS for data that is subject to slot-based scheduling.

FIG. 4 shows a case where the first DMRS is allocated to the third symbol and the second DMRS (additional DMRS) is allocated to the ninth symbol in the data subject to slot-based scheduling. If the data field covers the ninth symbol, an additional DMRS is placed. Note that, if the data field does not include the ninth symbol, it is not necessary to arrange an additional DMRS.

Figure 5B:
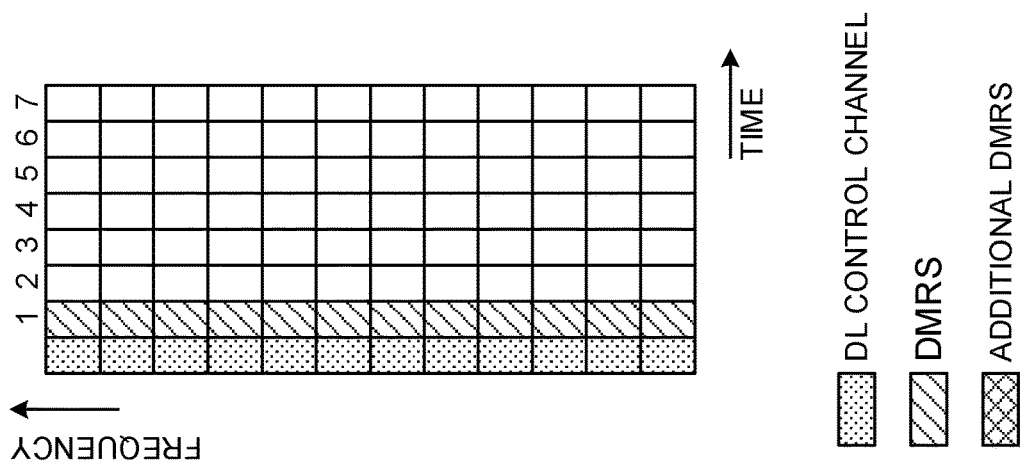
FIGS. 5A and 5B are diagrams to show an example of an additional DMRS for data that is subject to non-slot-based scheduling.
Figure 5A:
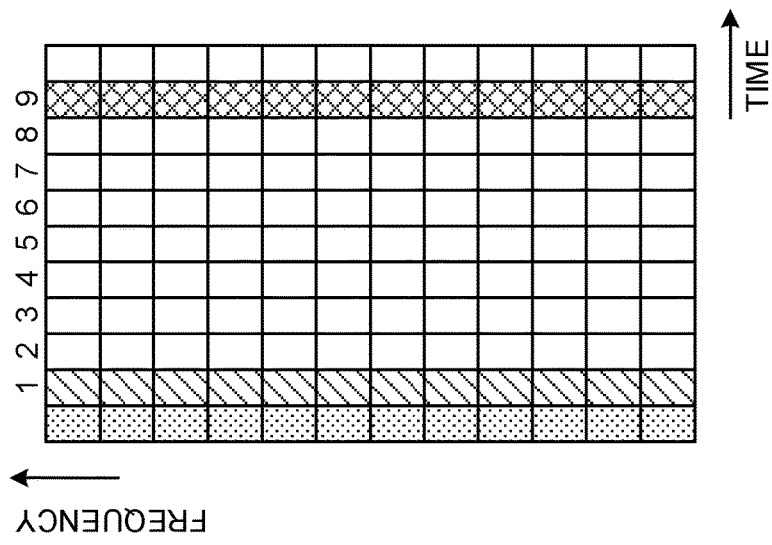

Meanwhile, when data is scheduled in non-slot-based scheduling, whether or not to provide an additional DMRS may be controlled depending on whether or not the size of the data field (for example, the mini-slot size) is designed to be X symbols or greater (see FIGS. 5A and 5B). For example, when the size of the data field is constituted to be X symbols or greater, an additional DMRS may be placed in the X-th symbol from the beginning of the data field (see FIG. 5A). FIG. 5B shows a case where, in non-slot-based scheduling, the data field is placed over ten symbols (the second to the eleventh symbol of the slot).

In this case, a first DMRS is placed in the first symbol of the data field, and a second DMRS (additional DMRS) is placed in the X-th symbol from the beginning. Note that the first DMRS and/or the second DMRS may be placed in a number of neighboring symbols (for example, two symbols). Note that the configuration of the first DMRS and the configuration of the second DMRS can be designed identically (by using, for example, the same DMRS configuration type, sequence and so forth).

Meanwhile, when data is scheduled in non-slot-based scheduling, if the size of the data field (for example, the mini-slot size) is designed to be less than X symbols, no additional DMRS is arranged (see FIG. 5B).

Note that, in FIG. 4, the position of X is determined with respect to the starting position of a slot, in slot-based scheduling, but this is by no means limiting. For example, in slot-based scheduling, the interval from the location where data is allocated, to an additional DMRS, may be set to X, or the interval from the position of the DMRS near the beginning, to an additional DMRS, may be set to X.

Note that, although, in FIGS. 5A and 5B, the location of X is determined with respect to the starting position of the data field in non-slot-based scheduling, this is by no means limiting. For example, in slot-based scheduling, the interval from the first symbol to an additional DMRS may be set to X, or the interval from the position of the DMRS near the beginning, to an additional DMRS, may be set to X.

Note that, in FIG. 4 and FIGS. 5A and 5B, the number of additional DMRSs is one, but this is by no means limiting. For example, there may be two additional DMRSs, or three or more additional DMRSs.

In this way, whether or not to provide a non-slot-based additional DMRS is controlled based on where a slot-based additional DMRS is located, so that no signaling is necessary to report placement of a non-slot-based additional DMRS. Also, when the non-slot-based scheduling unit (mini-slot size) is equal to or larger than a predetermined value, a structure to use multiple DMRSs is used, as in slot-based scheduling, the accuracy of channel estimation can be secured as in slot-based scheduling.

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 6:
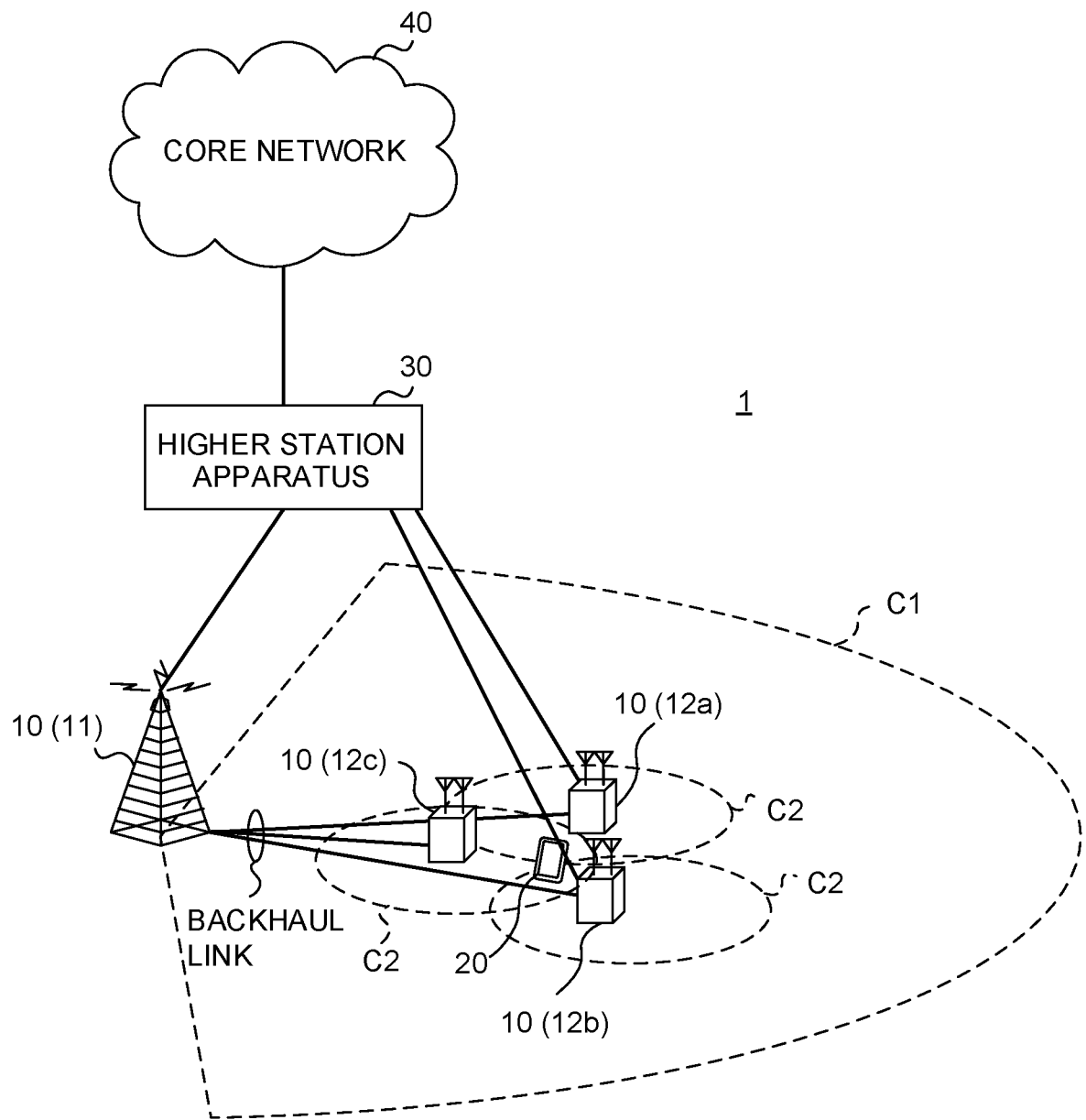
FIG. 6 is a diagram to show an exemplary schematic structure of a radio communication system according to an embodiment of the present invention.

FIG. 6 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 6 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure which different numerologies are applied between cells may be adopted. Note that a "numerology" refers to a set of communication parameters that characterize the design of signals in a given RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Also, in each cell (carrier), a slot having a relatively long time length (for example, 1 ms) (also referred to as a "TTI," a "normal TTI," a "long TTI," a "normal subframe," a "long subframe," a "subframe" and so forth) and/or a slot having a relatively short time length (also referred to as a "mini slot," a "short TTI," a "short subframe," and so forth) may be used. To be more specific, slot-based scheduling and non-slot-based scheduling can be used. Furthermore, in each cell, subframes of two or more time lengths may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on.

Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL. Also, SC-FDMA can be applied to a side link (SL) that is used in inter-terminal communication.

In the radio communication system 1, a DL data channel (PDSCH (Physical Downlink Shared CHannel), which is also referred to as, for example, a "DL shared channel"), which is shared by each user terminal 20, a broadcast channel (PBCH (Physical Broadcast CHannel)), L1/L2 control channels and so on are used as DL channels. User data, higher layer control information and SIBs (System Information Blocks) are communicated in the PDSCH. Also, the MIB (Master Information Block) is communicated in the PBCH.

The L1/L2 control channels include DL control channels (PDCCH (Physical Downlink Control CHannel), EPDCCH (Enhanced Physical Downlink Control CHannel), and/or other channels), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH retransmission control information (also referred to as "A/N," "HARQ-ACK," "HARQ-ACK bit," "A/N code book" and so on) can be communicated using at least one of the PHICH, the PDCCH and the EPDCCH.

In the radio communication system 1, a UL data channel (PUSCH (Physical Uplink Shared CHannel), which is also referred to as "UL shared channel" and so on), which is shared by each user terminal 20, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of PDSCH retransmission control information (also referred to as "A/N," "HARQ-ACK," and so on), channels state information (CSI) and so on, is communicated in the PUSCH or the PUCCH. By means of the PRACH, random access preambles for establishing connections with cells are communicated.

(Radio Base Station)

Figure 7:
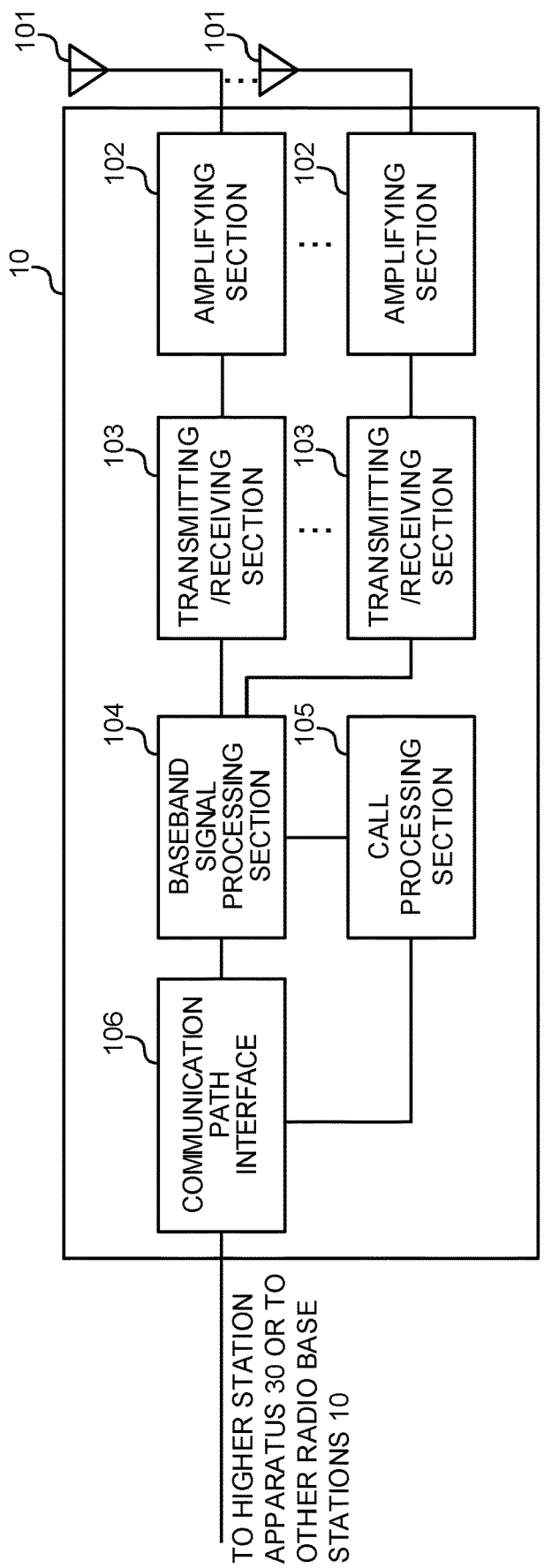
FIG. 7 is a diagram to show an exemplary overall structure of a radio base station according to the present embodiment.

FIG. 7 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided. The radio base station 10 may be "receiving apparatus" in UL and "transmitting apparatus" in DL.

User data to be transmitted from the radio base station 10 to a user terminal 20 is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

Also, the transmitting/receiving sections 103 transmit DL signals (for example, at least one of DCI (including at least one of DL assignment, UL grant, and shared DCI) DL data (channel), reference signals, and high layer control information) and/or receive UL signals (for example, at least one of UL data (channel), UCI, reference signals, and higher layer control information).

To be more specific, the transmitting/receiving sections 103 may transmit a DL data channel (for example, PDSCH) in a transmission period of a variable length (for example, a slot, a mini-slot, a predetermined number of symbols, and so on), and/or receive a UL data channel (for example, PUSCH).

In addition, the transmitting/receiving sections 103 apply the same configuration (for example, DMRS configuration type) to the DMRS for data that is subject to slot-based scheduling and to the DMRS for data that is subject to non-slot-based scheduling, and transmit these DMRSs. In addition, the transmitting/receiving sections 103 report information about the DMRS configurations to apply to DL communication and/or UL communication to the UE. This information related to DMRS configurations may be reported for slot-based scheduling, or may be reported for both slot-based scheduling and non-slot-based scheduling.

Figure 8:
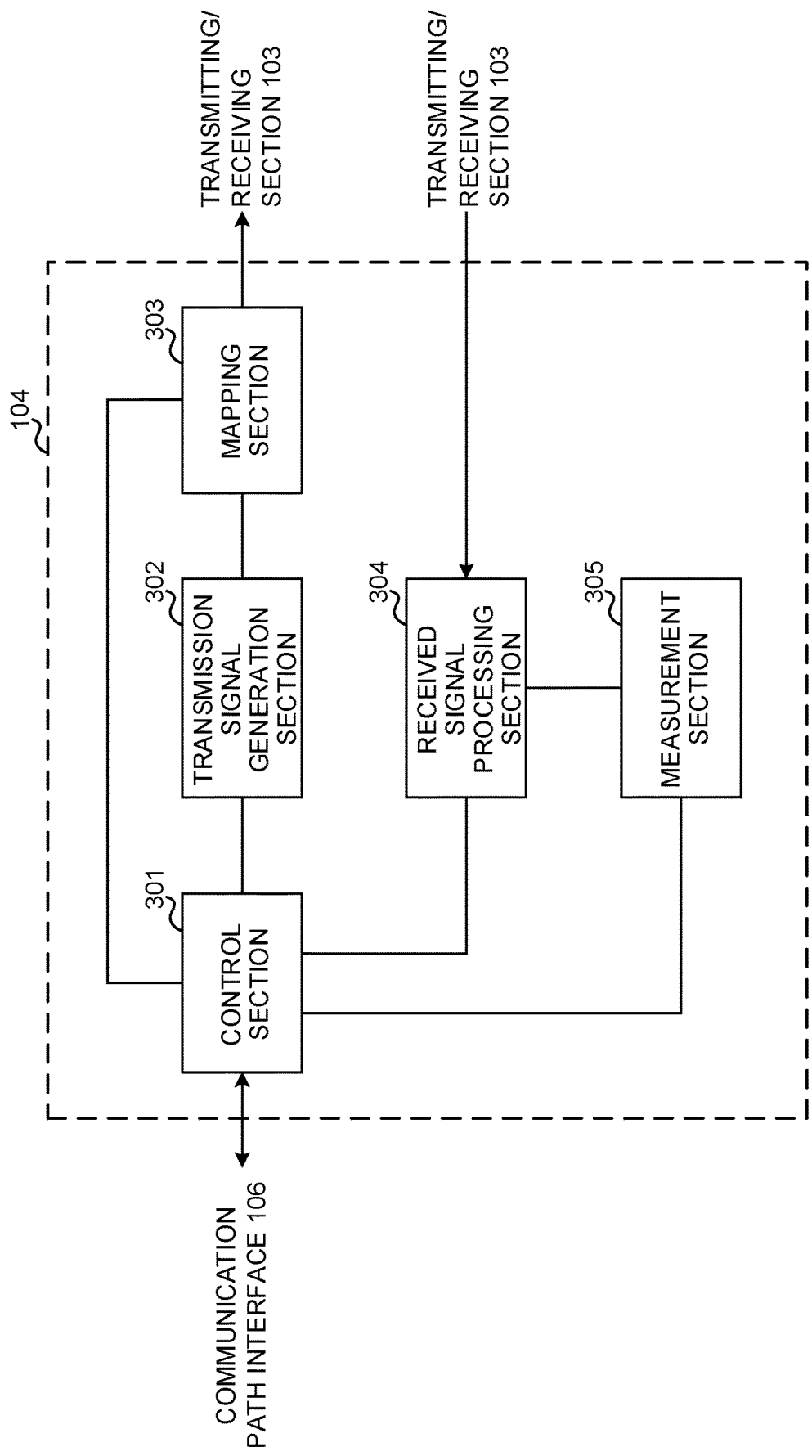
FIG. 8 is a diagram to show an exemplary functional structure of a radio base station according to the present embodiment.

FIG. 8 is a diagram to show an exemplary functional structure of a radio base station according to the present embodiment. Note that, although FIG. 8 primarily shows functional blocks that pertain to characteristic parts of the present embodiment, the radio base station 10 has other functional blocks that are necessary for radio communication as well. As shown in FIG. 8, the baseband signal processing section 104 at least has a control section 301, a transmission signal generation section 302, a mapping section 303, a received signal processing section 304 and a measurement section 305.

The control section 301 controls the whole of the radio base station 10. The control section 301 controls, for example, at least one of generation of downlink signals in the transmission signal generation section 302, mapping of downlink signals in the mapping section 303, the receiving process (for example, demodulation) of uplink signals in the received signal processing section 304, and measurements in the measurement section 305. Also, the control section 301 may control the scheduling of data channels (including DL data channels and/or UL data channels).

In addition, the control section 301 controls the allocation (transmission) of a first DL reference signal, used to demodulate a data channel to which a first time unit is applied, and a second DL reference signal, which is used to demodulate a data channel to which a second time unit is applied. In addition, the control section 301 exerts control so that the same configuration is applied to the first DL reference signal and the second DL reference signal. In this case, the control section 301 may determine the configuration of the second DL reference signal based on the configuration of the first DL reference signal, or design the second DL reference signal by shifting the first DL reference signal in the time direction.

Also, the control section 301 may control receipt on assumption that the same configuration is applied to the first UL reference signal and the second UL reference signal.

In addition, the control section 301 may control the number of symbols where the second DL reference signal is placed, based on the number of layers used to transmit the data channel, to which the second time unit is applied. Furthermore, the control section 301 may control whether or not to allocate a plurality of second DL reference signals based on the symbol number where the first DL reference signal is placed, and the number of symbols where the data channel, to which the second time unit is applied, is allocated (second aspect and FIGS. 5A and 5B).

The control section 301 can be constituted by a controller, a control circuit or control apparatus that can be described based on general understanding of the technical field to which the present invention pertains.

The transmission signal generation section 302 may generate DL signals (including at least one of DL data (channel), DCI, DL reference signals, control information to be sent in higher layer signaling) as commanded from the control section 301, and output these signals to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources, as commanded from the control section 301, and outputs these to the transmitting/receiving sections 103. For example, the mapping section 303 maps reference signals to predetermined radio resources in arrangement patterns determined by the control section 301.

The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of uplink signals that are transmitted from the user terminals 20. For example, the received signal processing section 304 may demodulate a UL data channel by using a reference signal provided in an arrangement pattern determined by the control section 301.

To be more specific, the received signal processing section 304 may output the received signals and/or the signals after receiving processes to the measurement section 305.

For the received signal processing section 304, a signal processor, a signal processing circuit or signal processing apparatus that can be described based on general understanding of the technical field to which the present invention pertains can be used. Also, the received signal processing section 304 can constitute the receiving section according to the present invention.

The measurement section 305 may measure UL channel quality based on, for example, the received power (for example, RSRP (Reference Signal Received Power)) and/or the received quality (for example, RSRQ (Reference Signal Received Quality)) of reference signals. The measurement results may be output to the control section 301.

(User Terminal)

Figure 9:
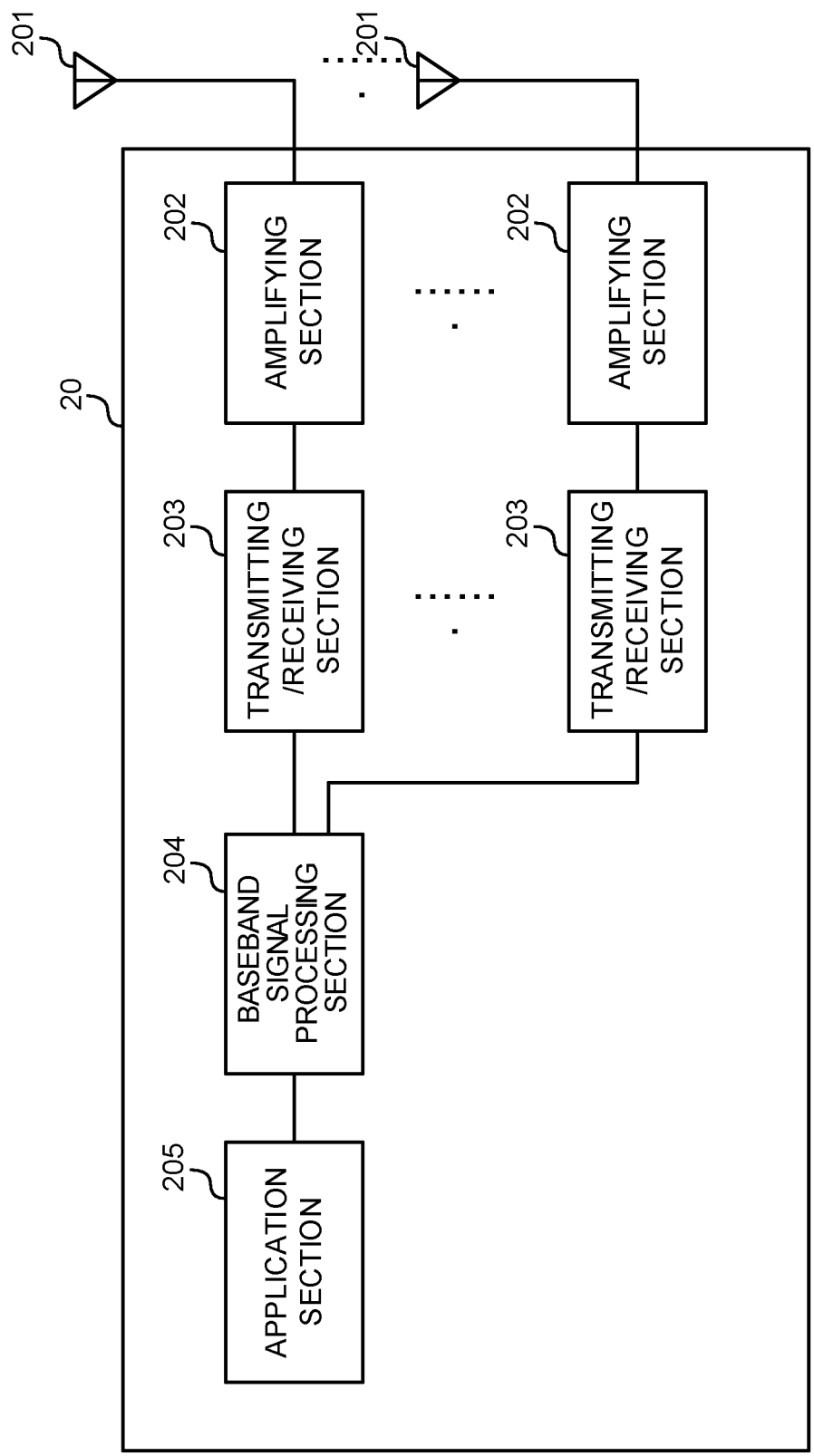
FIG. 9 is a diagram to show an exemplary overall structure of a user terminal according to the present embodiment.

FIG. 9 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. The user terminal 20 may be "transmitting apparatus" in UL and "receiving apparatus" in DL.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to at least one of an FFT process, error correction decoding, a retransmission control receiving process and so on. The DL data is forwarded to the application section 205. The application section 205 performs processes related to higher layers above the physical layer and the MAC layer.

Meanwhile, UL data is input from the application section 205 to the baseband signal processing section 204. The baseband signal processing section 204 performs at least one of a retransmission control process (for example, an HARQ process), channel coding, rate matching, puncturing, a discrete Fourier transform (DFT) process, an IFFT process and so on, and the result is forwarded to each transmitting/receiving section 203. UCI (including, for example, at least one of an A/N in response to a DL signal, channel state information (CSI) and a scheduling request (SR), and/or others) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive DL signals (for example, at least one of DCI (including at least one of DL assignment, UL grant, and shared DCI) DL data (channel), reference signals and higher layer control information) and/or transmit UL signals (for example, at least one of UL data (channel), UCI, reference signals and high layer control information).

In addition, the transmitting/receiving sections 203 applies the same configuration (for example, DMRS configuration type) to the DMRS for data that is subject to slot-based scheduling and to the DMRS for data that is subject to non-slot-based scheduling, and transmit these DMRSs. In addition, the transmitting/receiving sections 203 report information about the DMRS configurations to apply to DL communication and/or UL communication to the UE. This information related to DMRS configurations may be reported for slot-based scheduling, or may be reported for both slot-based scheduling and non-slot-based scheduling.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 10:
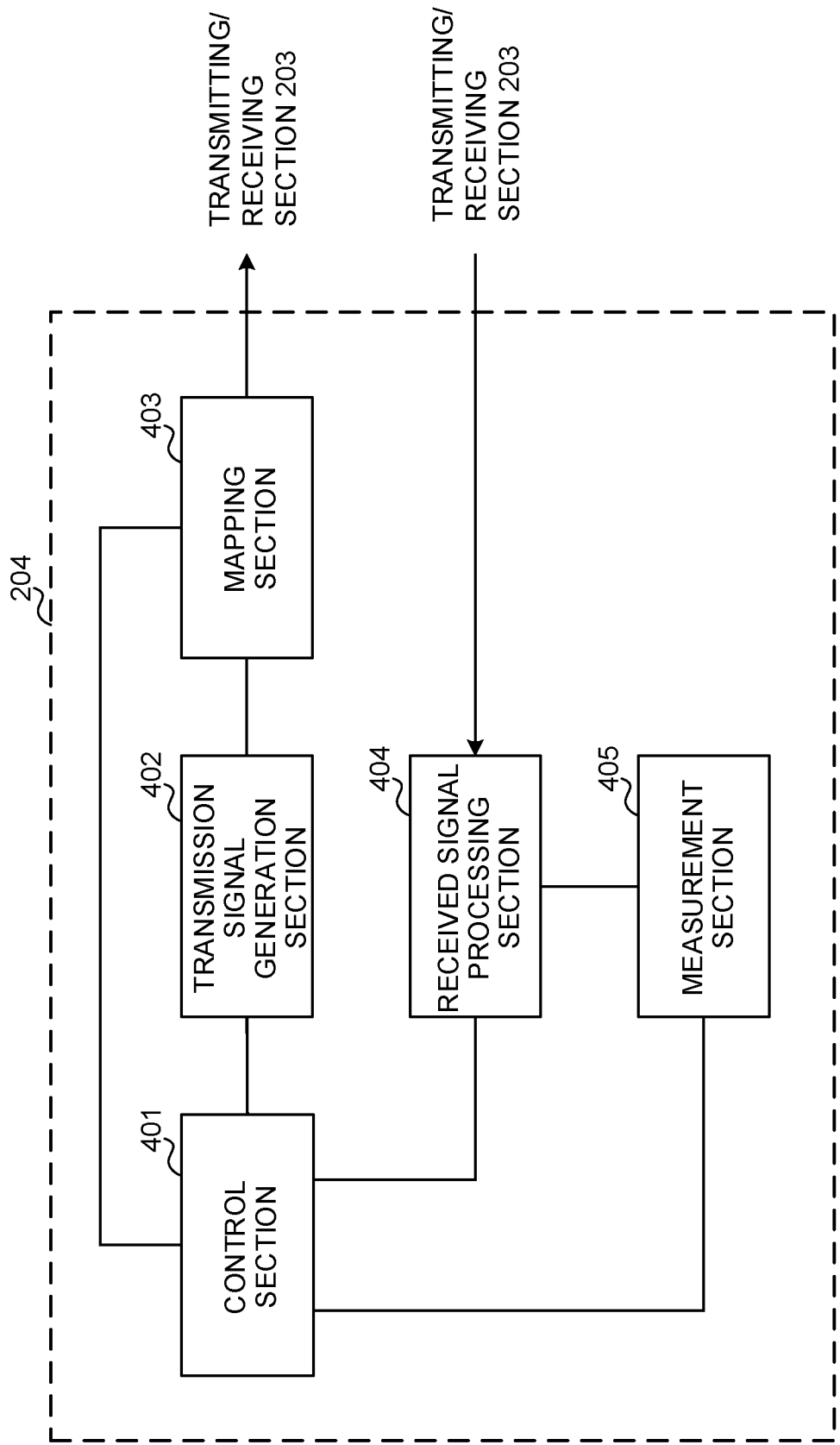
FIG. 10 is a diagram to show an exemplary functional structure of a user terminal according to the present embodiment.

FIG. 10 is a diagram to show an exemplary functional structure of a user terminal according to the present embodiment. Note that, although FIG. 10 primarily shows functional blocks that pertain to characteristic parts of the present embodiment, the user terminal 20 has other functional blocks that are necessary for radio communication as well. As shown in FIG. 10, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

The control section 401 controls allocation (transmission) of a first UL reference signal for demodulating a data channel to which a first time unit is applied, and a second UL reference signal for demodulating a data channel to which a second time unit is applied. For example, the control section 401 applies the same configuration to the first UL reference signal and the second UL reference signal. In this case, the control section 401 may determine the configuration of the second UL reference signal based on the configuration of the first UL reference signal, or design the second UL reference signal by shifting the first UL reference signal in the time direction.

Also, the control section 401 may control receipt on assumption that the same configuration is applied to the first DL reference signal and the second DL reference signal.

In addition, the control section 401 may control the number of symbols where the second UL reference signal is placed, based on the number of layers used to transmit the data channel, to which the second time unit is applied. In addition, the control section 401 may control whether or not to allocate a plurality of second UL reference signals based on the symbol number where the first UL reference signal is placed, and the number of symbols where the data channel, to which the second time unit is applied, is allocated (second aspect and FIGS. 5A and 5B).

For the control section 401, a controller, a control circuit or control apparatus that can be described based on general understanding of the technical field to which the present invention pertains can be used.

The transmission signal generation section 402 generates retransmission control information for UL signals and DL signals (by, for example, performing encoding, rate matching, puncturing, modulation, and so forth), as commanded from the control section 401, and outputs these to the mapping section 403. The transmission signal generation section 402 can be constituted by a signal generator, a signal generating circuit or signal generating apparatus that can be described based on general understanding of the technical field to which the present invention pertains.

The mapping section 403 maps the retransmission control information for UL signals and DL signals generated in the transmission signal generation section 402, to radio resources, as commanded from the control section 401, and output the result to the transmitting/receiving sections 203. For example, the mapping section 403 maps reference signals to predetermined radio resources in arrangement patterns determined by the control section 401.

The mapping section 403 can be constituted by a mapper, a mapping circuit or mapping apparatus that can be described based on general understanding of the technical field to which the present invention pertains.

The received signal processing section 404 performs receiving processes of DL signals (including, for example, at least one of demapping, demodulation and decoding). For example, the received signal processing section 404 may demodulate a DL data channel by using a reference signal provided in an arrangement pattern determined by the control section 401.

Also, the received signal processing section 404 may output the received signals and/or the signal after the receiving process to the control section 401 and/or the measurement section 405. The received signal processing section 404 outputs, for example, higher layer control information to be sent in higher layer signaling, L1/L2 control information (for example, UL grant and/or DL assignment) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that channel states may be measured on a per CC basis.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 11:
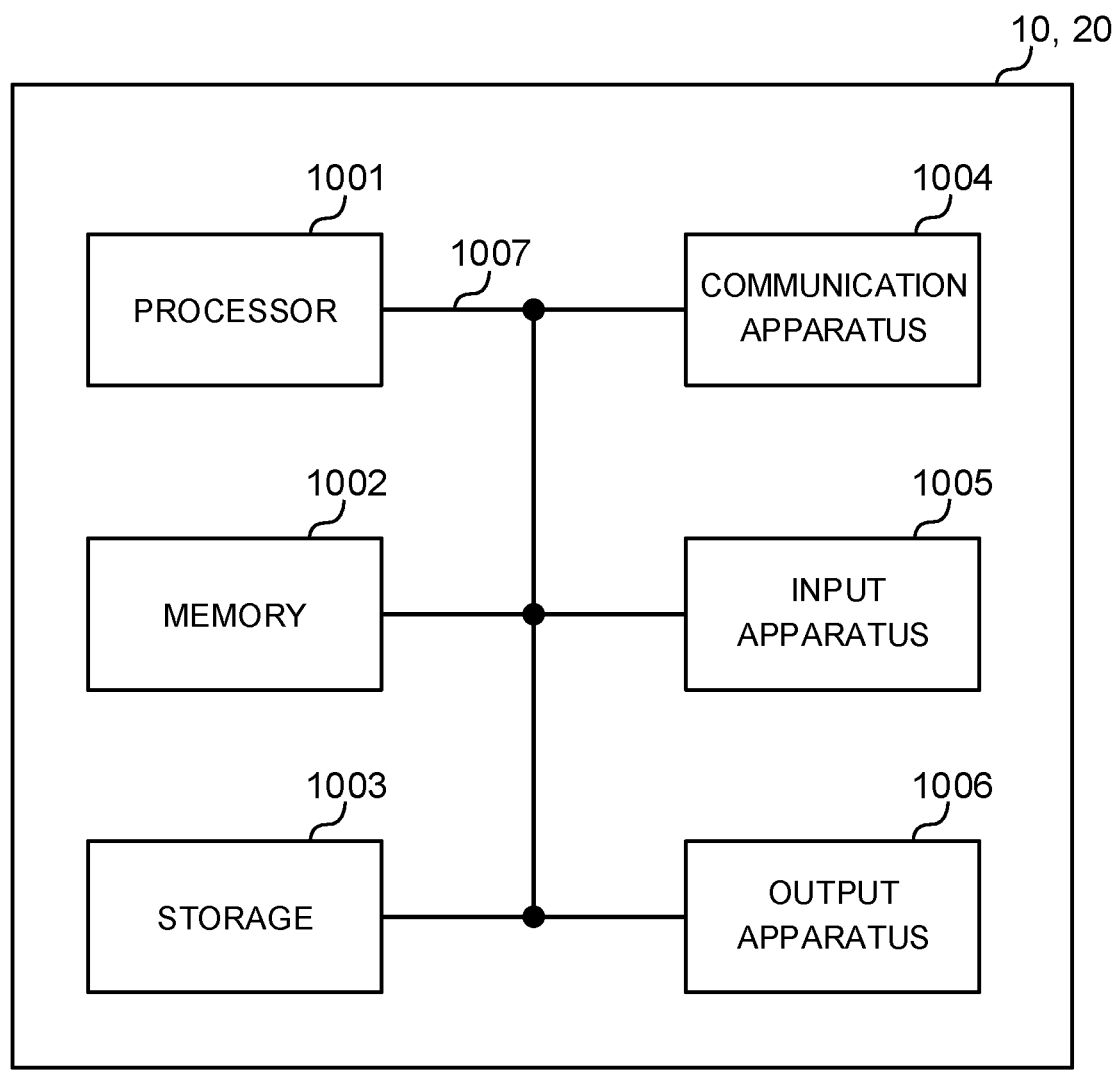
FIG. 11 is a diagram to show an exemplary hardware structure of a radio base station and a user terminal according to the present embodiment.

That is, a radio base station, a user terminal and so on according to an embodiment of the present invention may function as a computer that executes the processes of the radio communication method of the present invention. FIG. 11 is a diagram to show an example hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. Note that the processor 1001 may be implemented with one or more chips.

Each function of the radio base station 10 and user terminal 20 is implemented by allowing predetermined software (programs) to be read on hardware such as the processor 1001 and the memory 1002, and by a least one of allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Also, each device shown in FIG. 11 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time length (for example, 1 ms) that does not depend on numerology.

A slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each mini-slot may consist of one or more symbols in the time domain.

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and/or the transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on. Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, "uplink" and/or "downlink" may be interpreted as "sides." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A receiving apparatus comprising:
   a receiver that receives higher layer signaling that indicates a reference signal configuration type; and
   a processor that controls reception of a first reference signal, for a first downlink shared channel having a first allocation, and a second reference signal, for a second downlink shared channel having a second allocation that supports an allocation period and an allocation start symbol that are different from those of the first allocation, according to a reference signal configuration type 1 or a reference signal configuration type 2 configured by the higher layer signaling for the first reference signal and the second reference signal,
   wherein the processor controls an allocation of the first reference signal based on a slot start position, and controls an allocation of the second reference signal based on a start position of the second downlink shared channel.

2. The receiving apparatus according to claim 1, wherein the processor determines at least one of a number of symbols of the first reference signal and a number of symbols of the second reference signal based on downlink control information.

3. The receiving apparatus according to claim 1, wherein the processor determines a number of symbols of the second reference signal based on a number of symbols of the second downlink shared channel that applies the second allocation.

4. The receiving apparatus according to claim 1, wherein the processor independently configures a number of symbols of the first reference signal and a number of symbols of the second reference signal.

5. The receiving apparatus according to claim 2, wherein if the number of symbols of the second reference signal configured is greater than one, then the processor allocates the second reference signal to consecutive symbols.

6. The receiving apparatus according to claim 3, wherein if the number of symbols of the second reference signal configured is greater than one, then the processor allocates the second reference signal to consecutive symbols.

7. The receiving apparatus according to claim 4, wherein if the number of symbols of the second reference signal configured is greater than one, then the processor allocates the second reference signal to consecutive symbols.

8. A transmitting apparatus comprising:
   a receiver that receives higher layer signaling that indicates a reference signal configuration type; and
   a processor that controls transmission of a first reference signal, for a first uplink shared channel having a first allocation, and a second reference signal, for a second uplink shared channel having a second allocation that supports an allocation period and an allocation start symbol that are different from those of the first allocation, according to a reference signal configuration type 1 or a reference signal configuration type 2 configured by the higher layer signaling for the first reference signal and the second reference signal,
   wherein the processor controls an allocation of the first reference signal based on a slot start position, and controls an allocation of the second reference signal based on a start position of the second uplink shared channel.

9. A radio communication method for a receiving apparatus comprising:
   receiving higher layer signaling that indicates a reference signal configuration type;

controlling reception of a first reference signal, for a first downlink shared channel having a first allocation, and a second reference signal, for a second downlink shared channel having a second allocation that supports an allocation period and an allocation start symbol that are different from those of the first allocation, according to a reference signal configuration type 1 or a reference signal configuration type 2 configured by the higher layer signaling for the first reference signal and the second reference signal; and controlling an allocation of the first reference signal based on a slot start position, and controlling an allocation of the second reference signal based on a start position of the second downlink shared channel.

10. A system comprising a receiving apparatus and a transmitting apparatus, wherein:

the receiving apparatus comprises:

a receiver that receives higher layer signaling that indicates a reference signal configuration type, and a processor that controls reception of a first reference signal, for a first downlink shared channel having a first allocation, and a second reference signal, for a second downlink shared channel having a second allocation that supports an allocation period and an allocation start symbol that are different from those of the first allocation, according to a reference signal configuration type 1 or a reference signal configuration type 2 configured by the higher layer signaling for the first reference signal and the second reference signal; and the transmitting apparatus comprises:

a transmitter that transmits the higher layer signaling, wherein the processor controls an allocation of the first reference signal based on a slot start position, and controls an allocation of the second reference signal based on a start position of the second downlink shared channel.

* * * * *